March 31, 1953     E. G. BOICE ET AL     2,633,025
MEANS FOR INDICATING TEMPERATURES
Filed Feb. 23, 1951
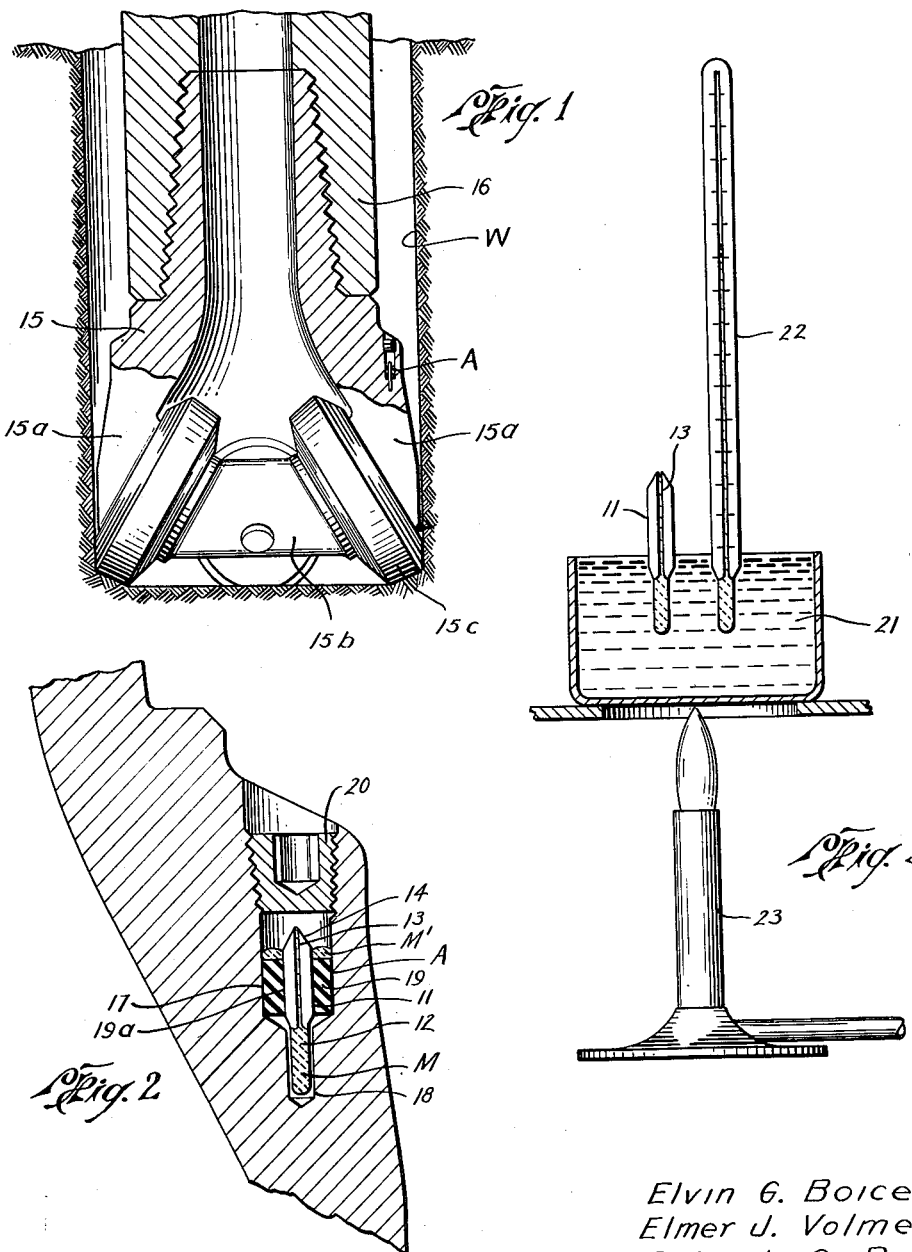
Elvin G. Boice
Elmer J. Volmert
Robert G. Peter
INVENTORS
BY J. Vincent Martin
and
Joel E. Edwards
ATTORNEYS Patented Mar. 31, 1953

2,633,025

UNITED STATES PATENT OFFICE 2,633,025

MEANS FOR INDICATING TEMPERATURES

Elvin G. Boice, Robert G. Peter, and Elmer J. Volmert, Houston, Tex., assignors to Reed Roller Bit Company, Houston, Tex., a corporation of Texas Application February 23, 1951, Serial No. 212,334

3 Claims. (Cl. 73—343)

This invention relates to new and useful improvements in and means for indicating temperatures.

It is desirable in employing various tools and equipment, such as drilling and coring bits, tool joints, instruments, drill collars and other devices, in well bores to determine the maximum temperature to which said tools and equipment were subjected or to determine the maximum temperature reached by material of which the tool is constructed while the same was within the well bore. This temperature indication provides valuable information as to well bore conditions and is also of importance in the selection of material and proper design of the tools and equipment.

It is one object of this invention to provide an improved means for determining and indicating the maximum temperature to which a well device was subjected while within a well bore; said means being adaptable for use with any type of carrier or device, such as a drill bit, core bit, core barrel, tool joint, substitute, drill collar, drill pipe or well instrument, which may be lowered within the well bore.

An important object is to provide an improved apparatus wherein a bulb containing a suitable substance, such as mercury, is mounted in the carrier and is arranged to permit escape of the substance through a restricted opening upon being subjected to the high temperatures encountered in the well bore, whereby the substance remaining within the bulb is a measure of the maximum temperature to which the bulb was subjected.

Another object is to provide an extremely simple, relatively small maximum temperature registering device which lends itself to mounting in any type of carrier tool or equipment, whereby it has universal application in all well operations.

A particular object is to provide a device, of the character described, having a bulb containing mercury or other substance and also having a restricted outlet whereby a predetermined temperature will cause expansion of the mercury and an escape of a portion thereof through the restricted outlet; the remaining mercury in the bulb being a measure of the maximum temperature to which the device was subjected and said maximum temperature being readily determinable by merely reheating the mercury to cause its expansion to the point where it reaches the end of the outlet, or by weighing the bulb before and after being subjected to said maximum temperature.

Still another object is to provide a maximum temperature registering unit which is adapted to be mounted within a recess or chamber in a well tool or device in any desired location and which is arranged to be resiliently mounted therein so that it will effectively withstand the jar or shock occasioned by the operation of said well tool or device.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a sectional view of a drill bit illustrating a temperature measuring device, constructed in accordance with the invention, mounted therein, Figure 2 is an enlarged sectional view of the measuring device, and Figure 3 is a view, illustrating the reheating of the measuring device to determine the maximum temperature to which the device was subjected while in the well bore.

In the drawings the letter A designates a maximum temperature registering unit constructed in accordance with the invention. This unit includes a bulb element 11 which is preferably constructed of glass and which is formed with a chamber 12 in its lower portion. The chamber 12 is arranged to receive a volume of a suitable substance, indicated at M in Figure 2, which will expand under heat; it has been found preferable to employ mercury and this description will assume that mercury is contained in the bulb, although it is to be understood that other substances, such as lead, gallium, silver or steel, which expand under heat would be suitable. Extending from the chamber 12 of the bulb element is a relatively elongate restricted passage 13 which has its outer end open and the external or outer surface of the element adjacent this open end is generally tapered or conical as indicated at 14. It will be evident that when the mercury M is heated it will expand and move outwardly through the elongate restricted passage 13 and at a predetermined temperature will escape from the outer end of said passage.

The bulb element 11 is adapted to be mounted within a carrier which may be any type of well tool, instrument or apparatus which is to be lowered within a well bore and as illustrated in Figures 1 and 2, the element is mounted within a drill bit 15 of usual construction. As is well known, the bit is secured to the lower end of a drill collar 16 and functions to drill the well bore W. In mounting the bulb element 11 within a bit a recess or chamber 17 is provided in some suitable location in the bit head and this recess or chamber is illustrated as provided in one of the side lugs or supports 15a of said bit. The bottom of the recess 17 is reduced at 18 and this reduced portion is of a slightly larger diameter than the lower portion of the bulb element 11, whereby the chamber 12 of the bulb element having the mercury M therein may be disposed within this reduced portion to locate the bulb element in an upright position. The upper portion of the bulb element extends into the chamber 17 and is surrounded by an elastic collar or grommet 19 which has its bore 19a snugly engaging the external surface of the bulb element, with its outer surface in engagement with the wall of the recess 17. The elastic collar thereby functions to frictionally and resiliently mount the bulb element 11 within the recess. A suitable plug or closure 20 threads into the upper end of the recess to close the same.

In use the unit A is mounted within the recess 17 and is lowered into the well bore as an integral part of the drill bit 15. The bit is operated in the usual manner to perform the drilling operation, and the mercury M within the bulb element 11 is subjected to the temperature within the well bore as well as to the temperature of the body of the bit which is occasioned by the heat generated by the drilling operation. As the mercury M is subjected to heat, said mercury undergoes an expansion which causes the same to travel upwardly through the restricted passage 13 and overflow from the open upper end of said passage into that area of the recess 17 above the elastic collar or grommet 19. This mercury which escapes from the passage 13 will be trapped on the upper end of the collar as indicated at M' in Figure 2. The maximum temperature to which the unit A is subjected while within the well bore will determine the volume of mercury which escapes from the interior of the bulb element, and thus the mercury remaining in the chamber 12 is a measure of this maximum temperature.

When the bit is withdrawn from the well bore to the surface, the mercury will, of course, cool and will contract back into the chamber 12. However, the mercury which had escaped under maximum temperature conditions remains trapped on top of the elastic collar or grommet. The bulb element is then removed from the recess or chamber 17 and its lower portion is placed into a fluid bath contained within a receptacle 21. An ordinary thermometer 22 is also placed into the fluid bath and suitable heat is applied to the receptacle 21 by a burner 23. The simultaneous application of heat to the bulb element 11 and to the thermometer causes the mercury in each unit to rise upwardly. As the mercury M within the bulb element 11 is heated and expands to a point where it is at the outlet end of the passage 13, a reading is taken from the thermometer 22 to indicate the exact temperature which was present within the well bore and which was the maximum temperature to which the bulb element 11 was subjected. Of course, it is evident that any suitable means may be employed for applying the heat to the bulb element 11 and to the thermometer to determine the maximum temperature to which the bulb element was subjected when in the well bore.

As has been stated, the bulb element is illustrated as mounted within the side lug or support 15a of the bit, but since it is relatively small in size it could be mounted in the cross-bridge 15b of the bit or at a point adjacent the bearings of the roller cutters 15c of said bit. Thus, the unit A can be employed for registering the maximum temperature of any portion of the bit.

It is not necessary that the particular unit and the method of determining maximum temperatures be applied only to drill bits for it would be possible to mount the unit A within a core bit, core barrel, tool joint, drill collar, well instrument or even in the drill pipe. It is thus evident that the invention is applicable for determining maximum temperature to which a tool or device is subjected or may be employed for determining maximum temperature encountered within a well bore. The particular type of carrier which is shown as a drill bit in the drawings is subject to wide variation. The use of the elastic collar or grommet provides a simple and effective means for mounting the bulb element to prevent undue shock or jar due to the operation of the particular tool or device with which the element is associated; however, other arrangements for mounting the bulb element within the recess could be employed.

As has been noted, substances other than mercury may be employed and also it is not essential that the bulb element be upright since the passage 13 can be suitably restricted with respect to the substance employed that said substance can escape only when forced out by expansion due to heat. It is also noted that although the simultaneous application of heat to the bulb element and a thermometer is an accurate means of determining the maximum temperature to which the bulb was subjected, it would be possible to determine such maximum temperature by weighing the element before and after the same has been subjected to said temperature. This weighing method would be accurate because the substance remaining in the chamber is a measure of the maximum temperature to which the element is subjected.

The foregoing disclosure and description of the invention is illustrative and explanatory thereof and various changes in the size, shape and materials, as well as in the details of the illustrated construction may be made, within the scope of the appended claims, without departing from the spirit of the invention.

Having described the invention, we claim:

1. The combination with a drill bit having a vertical recess therein of a maximum temperature registering device mounted in said recess and comprising a bulb element having a chamber containing a heat-expansible substance and having an upright restricted outlet extending from the chamber and with the upper end of the outlet communicationg with the interior of said recess, an elastic shock absorbing ring surrounding the bulb element intermediate the ends thereof and engaging the wall of the recess to resiliently mount the device within the recess and the upper surface of the shock absorbing ring being disposed in a plane below the upper end of the bulb element, whereby a trap is formed for any of the heat-expansible substance which is forced out of the upper end of said outlet due to the heat imparted from the drill bit.

2. The structure as set forth in claim 1, wherein said vertical recess includes a lower portion to receive said chamber of said temperature registering device and an upper portion of larger diameter than said lower portion to receive said shock absorbing ring, whereby said lower portion co-acts with said ring to maintain said temperature registering device in a vertical position.

3. The structure as set forth in claim 1, wherein the vertical recess in said drill bit is open at its upper end and is provided with internal threads, a plug having external threads engaging said internal threads to close said recess and prevent the admission of foreign objects thereinto.

ELVIN G. BOICE.
ROBERT G. PETER.
ELMER J. VOLMERT.

REFERENCES CITED

The following references are of record in the file of this patent:

UNITED STATES PATENTS

| Number | Name | Date |
|---|---|---|
| 785,524 | Shea | Mar. 21, 1905 |
| 2,155,635 | Bennett | Apr. 25, 1939 |
| 2,457,960 | Walker | Jan. 4, 1949 |
| 2,536,493 | Engelhardt et al. | Jan. 2, 1951 |

OTHER REFERENCES

Friedel et al. (article) Comptes Rendus; November 25, 1929, pages 891 and 892; vol. 189.